United States Patent
Aoki et al.

[11] 3,988,042
[45] Oct. 26, 1976

[54] VEHICLE ANTISKID CONTROL SYSTEM
[75] Inventors: Kazuhiko Aoki; Kennosuke Iida, both of Iwatsuki, Japan
[73] Assignee: Akebono Brake Industry Co., Ltd., Tokyo, Japan
[22] Filed: Oct. 30, 1975
[21] Appl. No.: 627,277

Related U.S. Application Data
[63] Continuation of Ser. No. 487,667, July 11, 1974, abandoned.

[30] Foreign Application Priority Data
July 21, 1973 Japan.............................. 48-82193

[52] U.S. Cl............................... 303/21 BE; 303/20
[51] Int. Cl.$^2$........................................... B60T 8/08
[58] Field of Search ...................... 180/82 R, 10 SE; 188/181 C; 303/20, 21; 307/10 R; 317/5; 324/161; 340/53, 62, 263

[56] References Cited
UNITED STATES PATENTS

| | | |
|---|---|---|
| 3,401,984 | 9/1968 | Williams et al. ................. 303/21 BE |
| 3,525,553 | 8/1970 | Carp et al. .......................... 303/21 P |
| 3,713,705 | 1/1973 | Michellone et al. ................ 303/21 P |
| 3,773,364 | 11/1973 | Michellone et al. ................ 303/21 P |
| 3,795,425 | 3/1974 | Marouby ............................. 303/21 P |
| 3,807,811 | 4/1974 | Nakamura et al. ............. 303/21 BE |
| 3,825,305 | 7/1974 | Kasselmann et al. ........... 303/21 BE |

Primary Examiner—Stephen G. Kunin
Attorney, Agent, or Firm—Toren, McGeady and Stanger

[57] ABSTRACT

An antiskid control system for vehicles which prevents the vehicle body from making irregular turns due to locking of wheels when the brake is applied. The brake pressure is reduced when the commencement of a locked state of the wheels is detected. On the other hand, a minimum value of the wheel velocity is memorized; the memorized value is compared with the wheel velocity; and through this comparison, the time for stopping the brake pressure reducing action is determined.

6 Claims, 13 Drawing Figures

VEHICLE ANTISKID CONTROL SYSTEM

This is a continuation of Application Ser. No. 487,667 filed July 11, 1974 now abandoned.

BACKGROUND OF THE INVENTION

This invention relates to a vehicle antiskid control system which prevents the vehicle body from making irregular turns with wheels locked when the brake is applied and is particularly concerned with a system wherein the brake pressure is reduced when the beginning of a locked state of wheels is detected; a minimum value of the wheel velocity is memorized; the memorized value is compared with the wheel velocity and the time for stopping the brake pressure reducing action is determined accordingly.

In the conventional antiskid systems of this kind, a wheel acceleration signal is obtained by differentiating the wheel velocity signal which is obtained from a pickup attached to the periphery of the wheel axle. When the acceleration signal becomes less than a certain negative value, a locked state of wheels is considered to have begun and the brake pressure is reduced by actuating a pressure modulator. The wheels are considered to have been relieved from the locked state when the acceleration signal becomes greater than a certain positive value. Then the operation of the pressure modulator is stopped and the brake pressure is made to increase gradually. This cycle of control is repeated to prevent a lock of wheels until the brake action is completed.

However, a problem with such systems lies in noises that are caused by shocks resulting from uneven road surfaces and at the time of gear shifting. Such noises tend to cause erroneous control actions. Such noises, being in a pulse-like state, are greatly exaggerated by differentiation.

In order to avoid such erroneous actions, there have been contrived various methods for detecting the beginning of a locked state of wheels. In such methods, for example, the control cycle is not commenced by reducing the brake pressure when the wheel acceleration signal merely becomes less than a certain negative value, but the wheel velocity at that time is first memorized and then, whether or not it is an actual decrease in wheel velocity, is confirmed by checking the wheel velocity after a certain period of time before the commencement of the control cycle. However, also in connection with the prevention of the above stated erroneous actions, there has been known no suitable method for detecting the recovery of wheels from a locked state.

SUMMARY OF THE INVENTION

It is an object of this invention to provide means for solving the problem of noise signals wherein the recovery of wheels from a locked state is detected not through a wheel acceleration signal like in the conventional methods, but by memorizing a minimum wheel velocity, i.e., a minimum wheel velocity in the control cycle, and by comparing the memorized value with the actual wheel velocity.

Another object of this invention is to provide means of resetting the above stated memorized wheel velocity for every control cycle in such a way as to prevent wheel locking in response to a deep drop of wheel velocity resulting from sudden braking so that sufficient recovery of wheel velocity can be ensured.

A further object of this invention is to provide means for detecting the vehicle body deceleration to discriminate a frozen road surface having a low coefficient of friction from a road surface of a high coefficient of friction so that an adequate recovery of wheel speed can be always ensured irrespective of the coefficient of the road surface.

Figure 1:
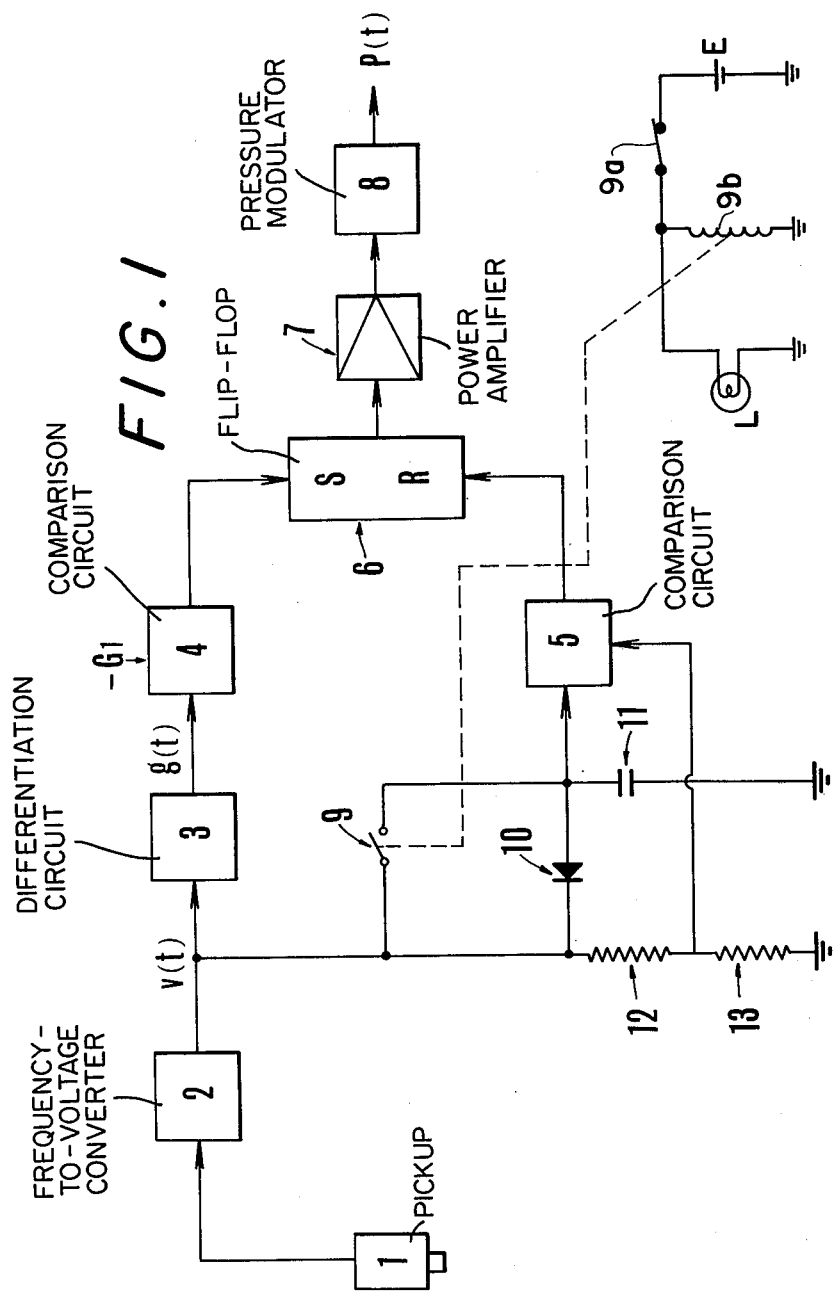
FIG. 1 is a circuit diagram showing a vehicle antiskid control system as an embodiment example of this invention.
Figure 2:
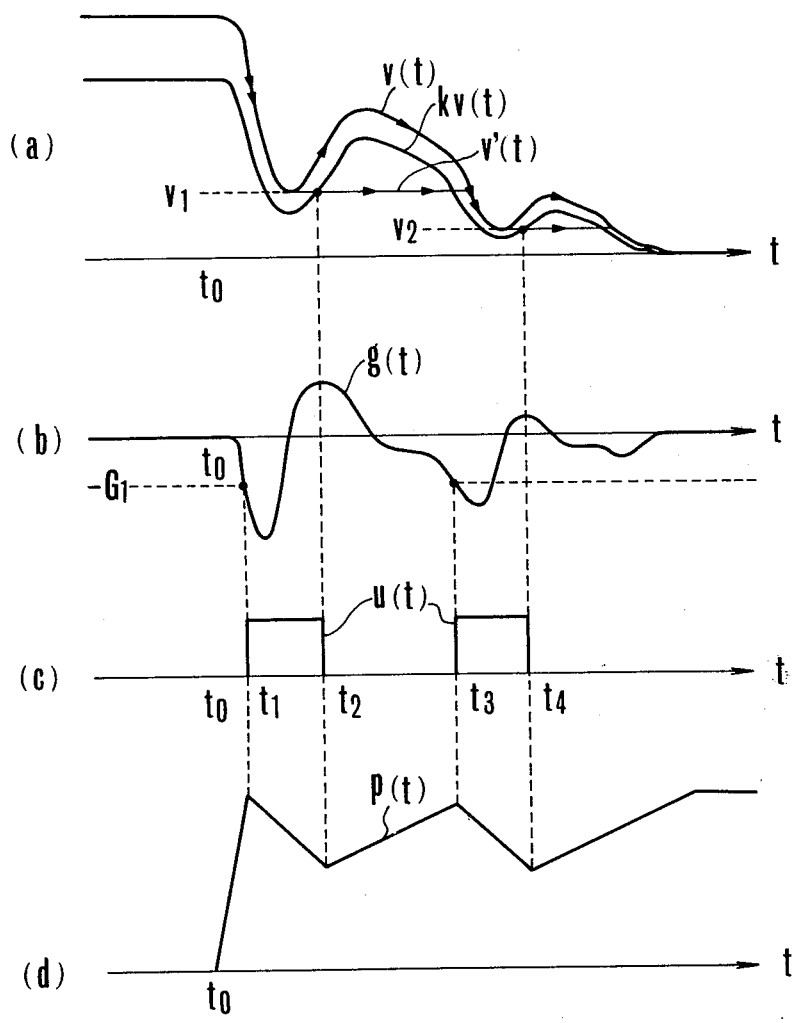
FIG. 2 graphs (a) through (d) show the relations to time of the wheel velocity signal, wheel velocity reduction signal, control signal and brake pressure in the example respectively.

DESCRIPTION OF THE PREFERRED EMBODIMENT:

In FIG. 1, a pickup 1 is mounted on the periphery of the wheel axle to obtain a pulse signal of frequency proportional to the rotational velocity of the wheel. A frequency-to-voltage converter 2 converts the signal from the pickup 1 into a voltage signal, $V(t)$ representing the wheel velocity. A differentiation circuit 3 makes the velocity signal $V(t)$ into a wheel acceleration signal $g(t)$ as shown in FIG. 2 graph (b). The acceleration signal $g(t)$ is then compared with a predetermined negative value $-G1$ at the first comparison circuit 4. The instant (time $t1$) that the value $g(t)$ becomes less than $-G1$ the first comparison circuit 4 generates a pulse to bring about a set condition of a flip-flop circuit 6. The output of the flip-flop circuit 6 is a control signal $U(t)$ (a wheel lock detection signal), which actuates a pressure modulator 8 through a power amplifier 7 to relax the brake by reducing a brake pressure $P(t)$ as shown in FIG. 2 graph (d).

Furthermore, in FIG. 1, the reference numeral 9a represents a brake switch; the symbol L a brake lamp; 9b a coil disposed in parallel with the brake lamp L, and E a power source. When the brake is applied, the switch 9a closes; the lamp L lights and at the same time the coil 9b is energized to open the switch 9.

The above description covers an operation from the detection of the beginning of a lock of wheels to the loosening of the brake pressure. This merely represents an example of the conventional arrangement as also discribed in U.S. Pat. No. 3,494,671. The present invention is not limited to such arrangement. Also, in practising the invention, a means of preventing an erroneous control action due to a noise overlapping the acceleration signal $g(t)$ is added to the circuitry as mentioned in the foregoing. However, such means is omitted from the description here as it does not constitute an essential part of the present invention.

The velocity signal $V(t)$ is, on the other hand, introduced in a low value holding circuit comprising a switch 9, diode 10 and a condenser 11. One end of the condenser 11 is connected to the output side of the frequency-to-voltage converter 2 through the switch 9, which is linked to a brake pedal (not shown in the drawing) and closed when the brake is not applied, while the other end of the condenser is grounded. The diode 10 is arranged in parallel with the switch 9 and permits the discharge of the condenser 11 only. One input of the second comparison circuit 5 is a terminal voltage V'(t) of the condenser 11 and the other input is a velocity signal voltage KV(t) (0<K<1) that is divided by a group of resistors 12 and 13 arranged in series. The output signal of the second comparison circuit 5 serves to reset the flip-flop circuit.

When the brake is not applied, the switch 9 remains closed. Accordingly, the terminal voltage V'(t) of the condenser 11 is equal to the velocity signal V(t). In FIG. 2 graph (a), even when the switch 9 opens with the brake applied at time $t_o$, the discharge of the condenser 11 takes place through the diode 10 in the decreasing stage of the velocity signal V(t). Therefore, in that stage, the terminal voltage V'(t) of the condenser 11 decreases with the voltage signal V(t). As mentioned in the foregoing, the action to reduce the brake pressure begins at time $t1$. Then, when the wave form of the signal V(t) comes to make an upward turn as the wheel velocity begins to increase, voltage is applied to the diode 10 in the reverse direction thus bringing about a cut-off stage. Accordingly, the terminal voltage V'(t) of the condenser 11 remains at a minimum value V1 of the velocity signal up to then; and, from there, the wave form of the velocity signal V(t) and that of the terminal voltage V'(t) of the condenser 11 take separate routes respectively. The minimum value V1 is retained until the velocity signal V(t) becomes less than V1.

The terminal voltage of condenser 11, i.e., the held velocity signal V'(t) becomes one of the inputs to the above stated second comparison circuit 5. In the second comparison circuit 5, the velocity signal KV(t) divided by the resisters 12 and 13 is compared with the held signal V'(t). An output pulse is generated to reset the flip-flop circuit 6 the instant (time $t2$) the signal KV(t) becomes greater than V'(t). By this, the control signal U(t) is caused to be off and the operation of the pressure modulator 8 to reduce brake pressure stops to cause increase in the brake pressure. With the braking force of the brake thus gradually increased, it comes to bring about again the locked state of wheels. Then, in absolutely the same manner as before, the commencement of this locked state of wheels is detected at time $t3$ to reduce the brake pressure and, at time 4, the second minimum value V2 which is held at the above stated holding circuit is compared with the divided velocity signal KV(t). Through this, the brake pressure again begins to increase. The control cycle as described above is repeated until the brake action is completed.

In this manner, an adequate allowable degree of slip in wheel velocity can be obtained throughout the whole range of the wheel velocity from the high velocity region to the low velocity region thereof with the brake pressure reducing action stopped when the wheel velocity has recovered from the minimum value to a point of a preset rate.

Figure 3:
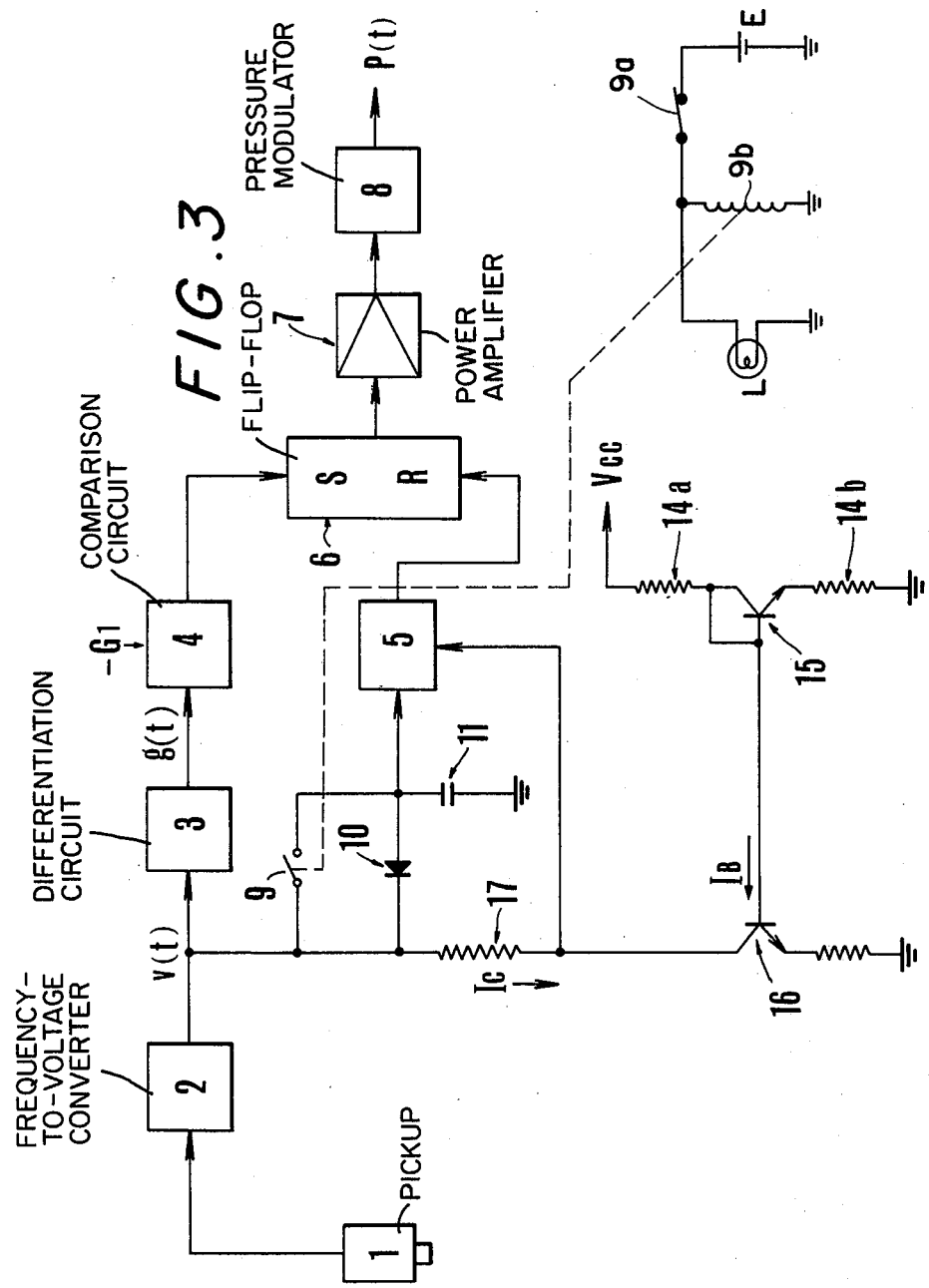
FIG. 3 is a circuit diagram showing a vehicle antiskid control system as the second example.

FIG. 3 shows the second example of embodiment of this invention. One of the inputs to the second comparison circuit 5 is the terminal voltage of the condenser 11 in the same manner as in the first example. A constant current circuit is composed of a resistor 14a connected to a power supply Vcc, another resistor 14b and a transistor 15. A constant base current $I_B$ is applied to the base terminal of a transistor 16. Assuming that the DC current amplification factor of the transistor 16 is $\beta$, the collector current Ic is of a constant value as expressed by $Ic = \beta I_B$. Accordingly, the other input voltage to the second comparison circuit 5 connected to the collector terminal of the transistor 16 is always a voltage obtained by subtracting from the velocity signal V(t) a constant value of voltage (potential difference between it and a resistor 17)$\Delta V = ICR17$ (wherein R17 represents the resistance value of the resistor 17). In the second comparison circuit 5, therefore, a value obtained by subtracting a constant value $\Delta V$ from the actual wheel velocity V(t) is compared with the memorized minimum value of the wheel velocity V(t) and the operation of the pressure modulator 8 to reduce brake pressure, is stopped by resetting the flip-flop circuit 6.

Figure 4:
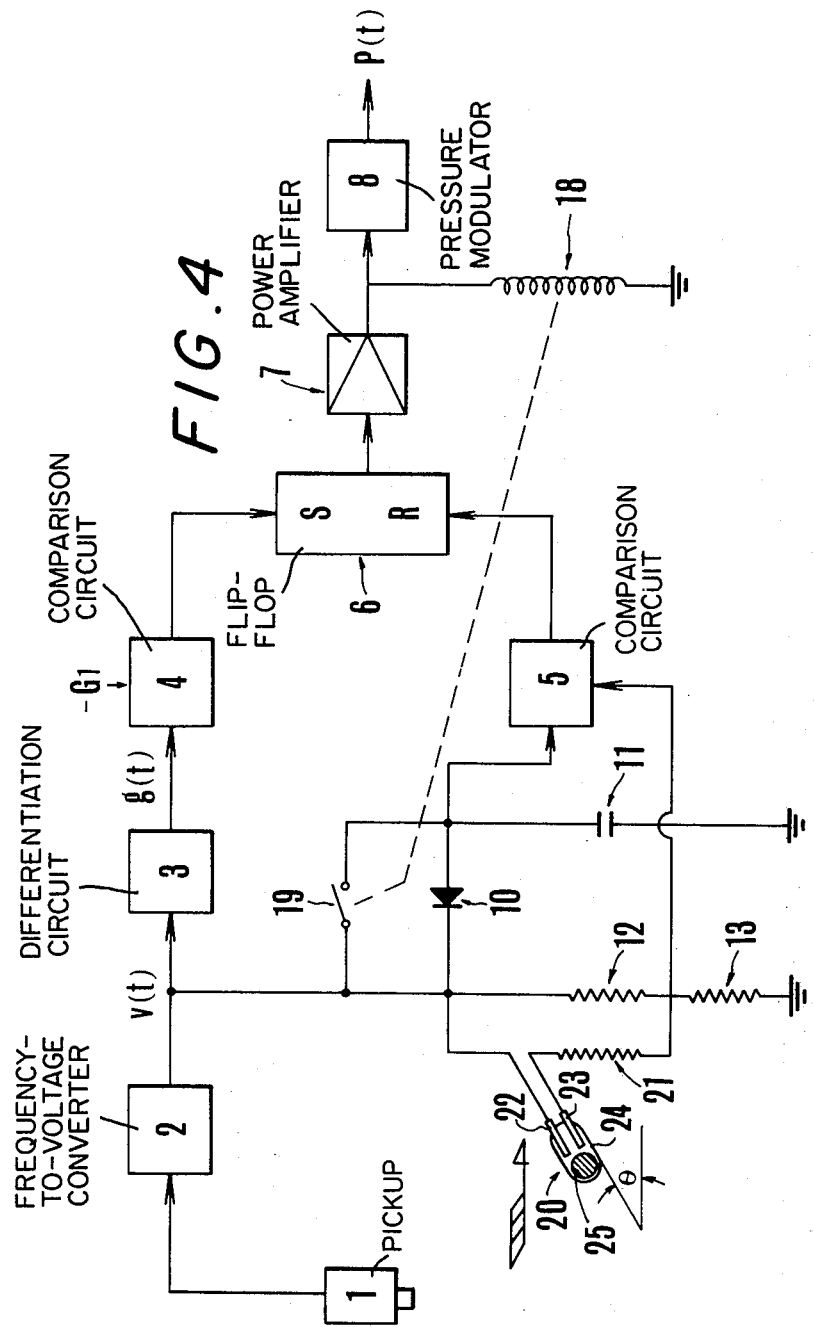
FIG. 4 is a circuit diagram showing another vehicle antiskid control system as the third example.

FIG. 4 is a block diagram showing the third embodiment example of the present invention. In FIG. 4, a solenoid 18 is exited by an amplified control signal U(t) of a power amplifier 7. A switch 19 which is arranged in parallel with a diode 10 normally remains closed and opens when the solenoid 18 is excited.

A deceleration detecting switch 20 and a resistor 21 are arranged in parallel with the above stated resistor 12. The deceleration detecting switch 20 comprises a pair of terminals 22 and 23 and mercury 25 enclosed in a glass tube 24. The switch 20 is secured to the vehicle structure at an angle $\theta$ to a horizontal plane. The vehicle is illustrated as moving in the direction of the arrow in the drawing. When the degree of reduction of the vehicle speed reaches a certain set value $\alpha = g \tan \theta$ ($g$ represents gravity acceleration), the mercury 25 rises to come into contact with both of the terminals 22 and 23, which are then short-circuited to connect the resistor 21 to the resistor 12 in parallel.

The operation is as described below

When the solenoid 18 is excited by the control signal U(t) which has detected a locked state of wheels, the switch 19 comes to open. Then, when a wheel velocity recovery signal from the second comparison circuit 5 resets the flip-flop circuit 6, the solenoid 18 is released from excitation; the switch 19 is closed; the minimum wheel velocity value of the above stated low-peak value holding circuit 10 and 11 is reset and the terminal voltage of the condenser 11 becomes equal to the wheel velocity signal V(t). This action repeats thereafter.

In the example shown in FIG. 1, as compared with a minimum value V1 of the wheel velocity first memorized, a minimum value V2 secondly memorized is lower and another minimum value V3 thirdly memorized is still lower. In sudden braking, when the minimum value V1 in the first control cycle is caused to be an extremely low value by the delayed action, the minimum values V2 and V3 in the second and third cycles become still lower than the extremely low value V1. This results in quicker locking. In accordance with this example, however, the memorized minimum value is reset for each control cycle. The minimum value to be memorized is unrestricted by another minimum value memorized in the preceding control cycle. Therefore, the possibility of such inconvenience is precluded in this example.

Figure 5:
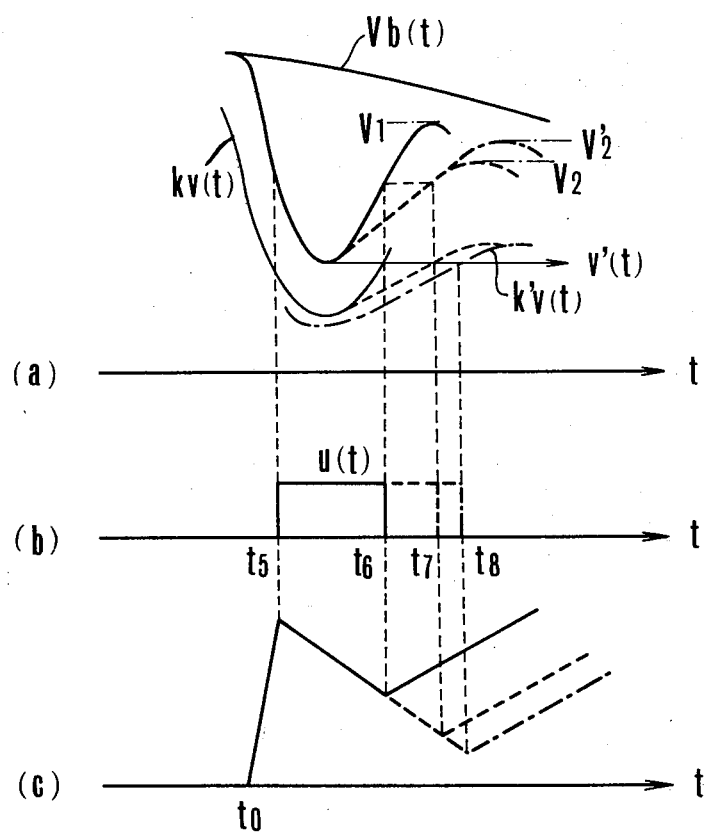
FIG. 5 graphs (a) through (c) show the relations to time of the wheel velocity signal, control signal and brake pressure in the third example respectively.

The deceleration detecting switch 20 and the resistor 21 are designed for recovering the wheel velocity to a degree suitable for the coefficient of friction of the road surface. In the example as shown in FIG. 1, the value of the constant K of the divided velocity voltage signal KV(t) which is one of the inputs to the second comparison circuit 5 is invariable. Therefore, as shown in FIG. 5, when a brake pressure lowering action is taken at time t5, the wheel velocity V(t) promptly recovers in cases where the road surface has a high coefficient of friction such as that of an asphalt road; then the brake pressure lowering action discontinues at time t6 and the wheel velocity is allowed to recover up to a maximum value V1 by inertia due to the time lag in the control system. On the other hand, where the coefficient of friction of the road surface is low like in the case of a frozen road surface, the wheel velocity V(t) does not readily recovers. Accordingly, in such a case, the brake pressure lowering action stops at time t7 which is later then the above stated time t6 and the wheel velocity recovers up to a maximum value V2 which is lower than the above stated maximum value V1. This relation is shown in FIG. 5 graph (a). As shown, the maximum value V2 drops deeper than the maximum value V1 in reference to the vehicle body speed Vb(t). Therefore, if the value of the above stated constant K is set to be suitable for a road surface of a high coefficient of friction, the brake pressure might be insufficiently lowered for a road surface of a lower coefficient of friction. Such insufficient reduction in brake pressure then tends to cause a lock of wheels. On the other hand, if the constant K is set at a value suitable for a road surface of a low coefficient of friction, the brake might be excessively relaxed for a road surface of a high coefficient of friction; and this results in the prolongation of the braking distance. FIG. 5 shows the above relation using a solid line for a road surface of a high coefficient of friction and a broken line for a road surface of a low coefficient of friction.

In this example, when the brake is applied in excess of a frictional force between the wheels and a road surface that has a high coefficient of friction, a high degree of reduction in velocity $a$ ($>g \tan \Lambda$) takes place in the vehicle. This causes the mercury 25 of the deceleration detecting switch 20 to rise thus short-circuiting the two terminals 22 and 23 and connecting the resistor 21 to resistor 12 in parallel. Accordingly one input voltage KV(t) to the second comparison circuit other than the memorized minimum value of wheel velocity which is another input to this circuit will be:

$$R_{13} \cdot V(t) / ( \frac{R12 \cdot R21}{R12 + R21} + R13)$$

wherein R12, R13 and R21 represent the values of resistors 12, 13 and 21 respectively. In the case of a road surface of a low coefficient of friction, the degree of reduction in velocity $a'$ ($<g \tan \theta$) is lower than the above stated velocity reduction degree $a$. Therefore, the mercury 25 does not move and the two terminals are not short-circuited. Accordingly, the above stated another input to the second comparison circuit 5, i.e., input voltage K'V(t) becomes $$\frac{R13}{R12 + R13} \cdot V(t)$$

It is now apparent that the comparison of the two is K>K'. In FIG. 5, the relation in the case of a road surface of a low coefficient of friction is represented by an imaginary line. This indicates that the time t8 at which the memorized minimum value V'(t) of wheel velocity becomes equal to the divided wheel velocity signal K'V(t) is later than the above stated time t7 and the wheel velocity V(t) recovers up to a maximum value V2' which is higher than the above stated maximum value V2. In this example, therefore, if the wheel velocity signal V(t) lowering degrees K and K' are preset as inputs to the second comparison circuit 5 respectively for road surfaces of high and low coefficients of friction, wheel velocity can be recovered to a degree suitable for the road surface condition.

It is also possible to arrange the above stated switch 20 and resistor R21 in parallel to the resistor R13. In this case, the switch 20 is arranged to be normally closed and opens when a high degree of velocity reduction takes place in the vehicle.

Figure 6:
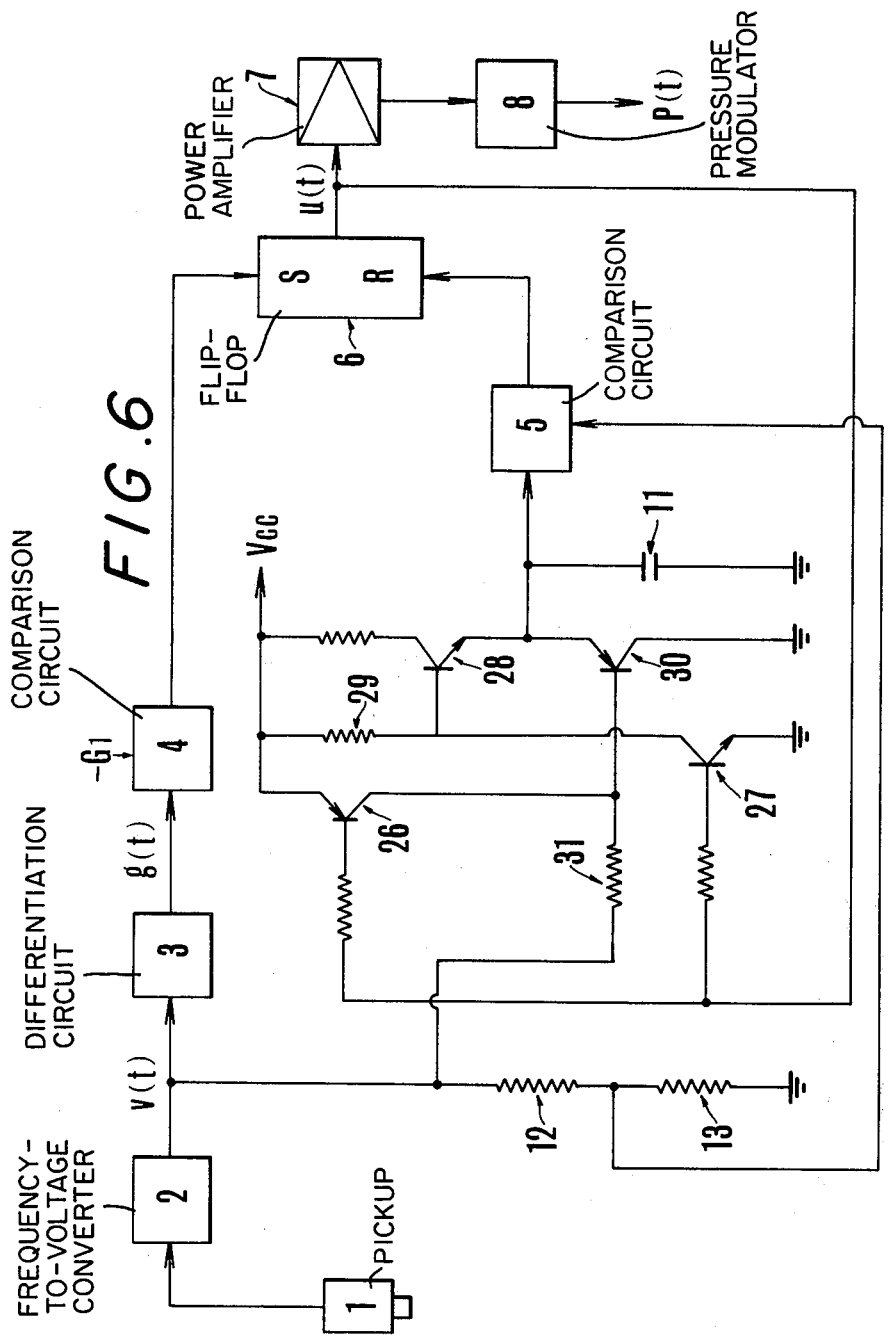
FIG. 6 is a circuit diagram showing another example of the low-peak value holding circuit of this invention.

FIG. 6 shows another example of the low peak value holding circuit of the present invention. In FIG. 6, the base terminals of transistors 26 and 27 are connected to the output terminals of the above stated control signal U(t) of the flip-flop circuit 6. The base terminal of a transistor 28 is connected to a reference power source Vcc through a resistor 29. The base terminal of a transistor 30 is connected through a resistor 31 to the velocity voltage signal V(t) from the frequency-to-voltage converter 2. The collector terminal of the transistor 26 is connected to the base terminal of the transistor 30 while the collector terminal of the transistor 27 is connected to the base terminal of the transistor 28. The emitter terminal of the transistor 28 and that of the transistor 30 are connected to the terminal on the plus side of the condenser 11 respectively. The terminal voltage of the condenser 11 becomes one of the inputs to the above stated second comparison circuit 5 in the same manner as in the previous example. The other input to the second comparison circuit 5 is the wheel velocity signal KV(t) which is divided by the resistors 12 and 13. The voltage of the reference power source Vcc is set at a value higher than the wheel velocity voltage signal V(t) which is obtained under a normal running condition. This example operates as described below:

When the brake is not applied, there is no output control signal U(t) from the flip-flop circuit 6; therefore, the transistor 26 is energized; the transistor 27 is not energized; the transistor 28 is energized; and the transistor 30 is not energized. Because of this, the terminal voltage of the condenser 11 is about equal to the voltage of the reference power source Vcc. With the brake applied, when the wheel velocity reducing degree g(t) reaches the above stated set value (−G1), the first comparison circuit 4 is actuated to bring the flip-flop circuit into a set state; then, the control signal U(t) is issued to relax the brake pressure. On the other hand, the control signal U(t) causes the transistor 26 to be in a deenergized state; the transistor 27 is energized; the transistor 28 is deenergized; and the transistor 30 is energized. By this the terminal voltage of the condenser 11 is caused to drop down to the wheel velocity signal V(t) of that time. After this, the terminal voltage of the condenser 11 still further drops with the wheel velocity signal V(t). When the wheel velocity signal V(t) takes a turn for acceleration and thus comes to increase, the transistor 30 is deenergized; and the terminal voltage of the condenser 11 no longer drops and is held at the voltage of that time. The holding voltage represents the minimum value of the wheel velocity and is one of the inputs to the second comparison circuit 5. When the minimum value becomes equal to the other input, i.e., a divided wheel velocity KV(t), the second comparison circuit 5 is actuated to reset the flip-flop circuit 6; then the pressure modulator 8 ceases to reduce the brake pressure and again the brake pressure increases.

To recapitulate the foregoing, the spirit of this invention is to memorize the minimum value of the wheel velocity; then to compare it with the ever-changing actual wheel velocity; and, by this comparison, to determine the time for shifting from a brake pressure lowering action to an increasing action. By such arrangement, the probability of the erroneous actions due to noises mentioned in the beginning of this description can be reduced to a great extent.

It is to be understood that the particular embodiments described in the foregoing and shown in FIG. 1 and FIG. 3 are illustrative and not restrictive and that various changes and modifications may be made without departing from the spirit of the invention. For example, the velocity signal V(t) may be used as an input signal to the second comparison circuit as it is and, in the second comparison circuit, the instant that the difference between the wheel velocity V(t) and the memorized minimum value of wheel velocity V'(t) comes to exceed a set value ΔV may be detected. Such may also be considered a kind of comparison between two signals. Anyway, such comparison will be apparent in the light of known electronic circuitry technique.

What is claimed is:

1. An antiskid control system for vehicles comprising:
    means for converting wheel velocity into voltage signals;
    means for detecting the commencement of a wheel locking state and for providing a control signal upon the detection of said locked state;
    a brake pressure modulator for reducing brake pressure in response to said control signal;
    a low peak value holding circuit for memorizing a minimum value of the wheel velocity voltage signal in a wheel velocity control cycle, said circuit including switching means which is normally conductive and which becomes non-conductive after said control signal appears, a condenser to which the wheel velocity signal is applied through said switching means when said switching means is conductive and means for allowing the condenser to discharge when the wheel velocity signal falls during a non-conductive condition of said switching means and for preventing condenser discharge when the wheel velocity signal reaches a minimum value; and
    a comparison circuit for comparing the wheel velocity voltage signal and the memorized minimum value in said holding circuit, said memorized minimum value being the voltage across said condenser, said comparison circuit providing an output signal to stop the brake pressure reducing action of said modulator, said system thereby providing a substantially noisefree response to wheel velocity for controlling said brake pressure modulation.

2. An antiskid control system according to claim 1, in which the comparison circuit compares the memorized minimum value which is the terminal voltage of said condenser in said holding circuit and a signal of voltage which is obtained by reducing the wheel velocity signal voltage at a preset rate, the voltage reduced at the present rate corresponding to a voltage at the interconnection of a pair of resistances in series with each other between the ground and the output side of said means for converting the wheel velocity into voltage signals; and a deceleration detection switch being arranged on the vehicle body to operate when the deceleration of the vehicle body reaches a preset value in such a manner that, with said switch in a conductive condition, another resistance is added to said pair of resistances to alter said preset rate at which the wheel velocity signal voltage is to be reduced, the brake reducing action of said brake pressure modulator being arranged to be stopped by the output of said comparison circuit according to the coefficient of friction of the road surface.

3. An antiskid control system according to claim 1, in which the comparison circuit compares the memorized minimum value which is the terminal voltage of said condenser in said holding circuit and a signal of voltage which differs from the wheel velocity signal voltage by a preset value of voltage; and said preset voltage difference corresponds to a potential difference between the two ends of a resistance through which there flows a collector current of a transistor which is arranged with a collector terminal connected to the output side of said means of converting the vehicle velocity into voltage signals and with a base current of a preset value being applied to said transistor, and the brake pressure reducing action of said brake pressure modulator being arranged to be stopped by the output of the comparison circuit.

4. An antiskid control system for vehicles comprising:
    means for converting wheel velocity into voltage signals;
    means for detecting the commencement of a wheel locking state and for providing a control signal upon the detection of said locked state;
    a brake pressure modulator for reducing brake pressure in response to said control signal;
    a low peak value holding circuit for memorizing a minimum value of the wheel velocity voltage in a wheel velocity control cycle, said circuit including switching means which is normally conductive and which becomes non-conductive after said control signal appears, a condenser having a terminal connected to a power source through the switching means when the switching means is conductive, a transistor having its output terminals connected across the condenser and having its control terminals coupl-d to the wheel velocity voltage signal, said transistor allowing the condenser to discharge when the wheel velocity voltage signal falls during a non-conductive condition of said switching means and for preventing condenser discharge when the sheel velocity signal reaches a minimum value; and
    a comparison circuit for comparing the wheel velocity voltage signal and the memorized minimum value in said holding circuit, said memorized minimum value being the voltage across said condenser, said comparison circuit providing an output signal to stop the brake pressure reducing action of said modulator, said system thereby providing a substantially noise-free response to wheel velocity for controlling said brake pressure modulator.

5. An antiskid control system for vehicles comprising:

means for converting wheel velocity into voltage signals;

means for detecting the commencement of a wheel locking state and for providing a control signal upon the detection of said locked state;

a brake pressure modulator for reducing brake pressure in response to said control signal;

a low peak value holding circuit for memorizing a minimum value of wheel velocity voltage signal in a wheel velocity control cycle, said circuit including switching means which is normally conductive and which becomes non-conductive after said control signal appears, a condenser to which the wheel velocity signal is applied through said switching means when said switching means is conductive and means for allowing the condenser to discharge when the wheel velocity signal falls during a non-conductive condition of said switching means and for preventing condenser discharge when the wheel velocity signal reaches a minimum value; and a comparison circuit for comparing the wheel velocity voltage signal and the memorized minimum value in said holding circuit, said memorized minimum value being the voltage across said condenser, said comparison circuit providing an output signal to stop the brake pressure reducing action of said modulator, said system thereby providing a substantially noisefree response to wheel velocity for controlling said brake pressure modulation, wherein the other input of said comparison circuit is a wheel velocity voltage signal which is reduced at a given rate, wherein the wheel velocity voltage signal is the voltage provided by a resistive voltage divider connected to said wheel velocity voltage signal and wherein a deceleration detector switch which operates when the vehicle deceleration reaches a given value is provided on the vehicle structure in such a way as to add another resistance to said resistive divider to make the reducing rate of the wheel velocity voltage signal variable when the switch is in an energized condition, so that the brake pressure reducing operation of said brake pressure modulator can be stopped according with the coefficient of friction of the road surface.

6. An antiskid control system for vehicles comprising:

means for converting wheel velocity into voltage signals;

means for detecting the commencement of a wheel locking state and for providing a control signal upon the detection of said locked state;

a brake pressure modulator for reducing brake pressure in response to said control signal;

a low peak value holding circuit for memorizing a minimum value of the wheel velocity voltage signal in a wheel velocity control cycle, said circuit including switching means which is normally conductive and which becomes non-conductive after said control signal appears, a condenser to which the wheel velocity signal is applied through said switching means when said switching means is conductive and means for allowing the condenser to discharge when the wheel velocity signal falls during a non-conductive condition of said switching means and for preventing condenser discharge when the wheel velocity signal reaches a minimum value; and a comparison circuit for comparing the wheel velocity voltage signal and the memorized minimum value in said holding circuit, said memorized minimum value being the voltage across said condenser, said comparison circuit providing an output signal to stop the brake pressure reducing action of said modulator, said system thereby providing a substantially noisefree response to wheel velocity for controlling said brake pressure modulation, wherein the other input to said comparison circuit is a voltage signal differing in voltage from the wheel velocity voltage signal by a given value of voltage; and the given value of voltage difference corresponds to a potential difference between both ends of a resistor through which the collector current of a transistor flows, said transistor being arranged to have the collector terminal thereof connected to the output side of said means of converting wheel velocity into a voltage signal, while a given value of a base current is applied to said transistor.

* * * * *